(12) United States Patent
Kong

(10) Patent No.: US 11,499,577 B2
(45) Date of Patent: Nov. 15, 2022

(54) BAND WINDING TYPE HOSE CLAMP

(71) Applicant: Jong Soo Kong, Busan (KR)

(72) Inventor: Jong Soo Kong, Busan (KR)

( * ) Notice: Subject to any disclaimer, the term of this patent is extended or adjusted under 35 U.S.C. 154(b) by 399 days.

(21) Appl. No.: 16/625,749

(22) PCT Filed: Jun. 19, 2018

(86) PCT No.: PCT/KR2018/006916
§ 371 (c)(1),
(2) Date: Dec. 22, 2019

(87) PCT Pub. No.: WO2018/236129
PCT Pub. Date: Dec. 27, 2018

(65) Prior Publication Data
US 2021/0156407 A1 May 27, 2021

(30) Foreign Application Priority Data
Jun. 22, 2017 (KR) .................. 10-2017-0079151

(51) Int. Cl.
*F16L 33/14* (2006.01)
*F16B 2/08* (2006.01)
(Continued)

(52) U.S. Cl.
CPC ............. *F16B 2/08* (2013.01); *F16L 21/06* (2013.01); *F16L 33/10* (2013.01); *F16L 33/14* (2013.01); *F16L 33/32* (2013.01)

(58) Field of Classification Search
CPC ............ F16B 2/08; F16L 33/10; F16L 33/14
(Continued)

(56) References Cited

U.S. PATENT DOCUMENTS 2,480,755 A * 8/1949 McElroy ................. F16L 33/14
24/269
3,962,759 A * 6/1976 Nagai ....................... F16B 2/08
24/269
(Continued)

FOREIGN PATENT DOCUMENTS

JP 04-95603 A 3/1992
JP 07-6591 U 1/1995
(Continued)

OTHER PUBLICATIONS

CA Office Action in Application No. 3067969 dated Mar. 26, 2021.
(Continued)

*Primary Examiner* — David Bochna
(74) *Attorney, Agent, or Firm* — Maschoff Brennan

(57) ABSTRACT

An example band winding type hose clamp may include: a body part engaged with and fixed to one end of a band; a winding part which is rotatably coupled to the body part, into which the other end of the band surrounding the outer periphery of the hose is inserted, and which is rotated by an external force to wind the other end of the band, whereby the band presses and closely contacts the outer periphery of the hose; and a cover part which is hingedly coupled to the body part spaced apart from the winding part while one end of the cover part is engaged with the winding part, and which selectively restrains the rotation of the winding part so as to maintain the elastic force of the band pressing the outer periphery of the hose.

3 Claims, 4 Drawing Sheets

(51) Int. Cl.
*F16L 21/06* (2006.01)
*F16L 33/10* (2006.01)
*F16L 33/32* (2006.01)

(58) Field of Classification Search
USPC ........................................................ 285/252
See application file for complete search history.

(56) References Cited

U.S. PATENT DOCUMENTS

| | | | | |
|---|---|---|---|---|
| 4,675,949 | A | * | 6/1987 | DaCosta ................. F16L 33/14 |
| | | | | 24/280 |
| 5,156,506 | A | | 10/1992 | Bailey |
| 5,661,876 | A | * | 9/1997 | Goldenberg ............ F16L 33/02 |
| | | | | 24/19 |
| 6,139,234 | A | * | 10/2000 | Huang .................... B60P 7/083 |
| | | | | 410/103 |
| 6,322,279 | B1 | * | 11/2001 | Yamamoto .............. B60R 9/045 |
| | | | | 403/93 |
| 8,056,192 | B1 | | 11/2011 | Posner |
| 2018/0170271 | A1 | * | 6/2018 | Garofano ................. F16B 2/08 |
| 2019/0314036 | A1 | * | 10/2019 | Huang ...................... F16B 2/10 |

FOREIGN PATENT DOCUMENTS

| | | |
|---|---|---|
| JP | H07-06591 U | 1/1995 |
| KR | 10-2010-0090028 A | 8/2010 |
| KR | 10-2011-0035161 A | 4/2011 |
| KR | 10-2017-0035157 A | 3/2017 |

OTHER PUBLICATIONS

KR Notification of Reason for Refusal dated Jul. 17, 2018 as received in Application No. 10-2017-0079151.
KR Grant of Patent dated Sep. 7, 2018 as received in Application No. 10-2017-0079151.

* cited by examiner

BAND WINDING TYPE HOSE CLAMP

TECHNICAL FIELD

The present invention relates to a band winding type hose clamp, and more particularly to a band winding type hose clamp for firmly fixing, to an installation place, a tubular hose used to feed a fluid such as water or gas to a designated place without being separated, by fastening the hose by a fastening member such as a band having a belt shape.

BACKGROUND ART

Unless stated otherwise, the content described in this section is not prior art to the claims in this application and is not admitted to be prior art by inclusion in this section.

Hose clamps are used to fasten hoses used to enable fluid or gas to communicate with a brake of an automobile, an air conditioning system, power steering, or an engine compartment, or hoses connected for communication of a fluid or gas in other industrial fields in order to prevent separation of the hoses or the like.

That is, hose clamps are used in various industrial fields such as marine shipbuilding, communication, automobiles, air conditioners, ducts of coolers, service pipes, and sheaths of industrial electric cables or insulators.

When such a hose clamp is used in a vehicle, the hose clamp connects a rubber hose and a pipe, which are mounted to the vehicle, in order to prevent leakage of a fluid such as an engine fluid, a coolant, or a brake fluid.

Conventionally, various kinds of hose clamps have been used. Recently, a clamp having a compensation function of compensating for variation in diameter of a hose occurring due to aging thereof caused by long-term use thereof has been developed and used.

Generally, the above-mentioned hose clamp has a configuration including a band surrounding a hose, a fastening housing coupled to the band, and a fastening screw. In this case, as the fastening screw rotates, the band, which is formed with grooves at a uniform interval, is fastened by the fastening screw and, as such, the clamp is fastened. Accordingly, even when fastening force is lost, it may be possible to reinforce clamping force using the fastening screw.

However, the hose clamp, which uses the fastening screw having a bolt shape, as mentioned above, has a problem in that, when the hose clamp is used in an engine compartment of a vehicle having a complex structure, the hose clamp may interfere with various elements installed in the engine compartment because the fastening clamp is typically fastened in a circumferential direction of the band.

When the hose clamp is applied to eco-friendly vehicles, spread of which has recently been increased, the hose clamp exhibits degraded assemblability because an element such as high-voltage wiring is additionally installed. Furthermore, the hose clamp may interfere with the high-voltage wiring, etc. and, as such, a sheath of the high-voltage wiring may be peeled off. In this case, an electrical problem may occur in an associated vehicle.

In addition, a space for manipulating a tool is insufficient because the fastening clamp is fastened in the circumferential direction of the band and, as such, the task becomes difficult. For this reason, there may be problems of degraded task speed and degraded assemblability.

Furthermore, when the fastening screw, which has a bolt shape, is strongly fastened in order to firmly fasten the clamp, tearing of the clamp may occur. In this case, the clamp can no longer be used. Otherwise, fastening force is rather decreased due to tearing of the clamp. As a result, the original function of the clamp may be lost.

Meanwhile, for use of the fastening screw having the bolt shape, the band should be formed with continuous grooves corresponding to threads of the fastening screw. To this end, a separate process and a separate expense for manufacture of the band are required.

Furthermore, it is impossible to fasten the clamp using a general band having no groove because the fastening screw having the bolt shape is used. For this reason, there is a problem in that use of the band is limited.

In addition, an end of the band drawn in accordance with fastening of the fastening screw is maintained in an externally protruded state without being fixed to any place. For this reason, there may be an appearance problem. There may also be a problem in that the band end may interfere with various elements installed in the engine compartment or may injure the worker during a task.

DISCLOSURE

Technical Problem

An object of the present invention devised to solve the problem is to provide a band winding type hose clamp having a relatively simple structure while preventing loosening thereof caused by vibration generated by an engine of a vehicle or due to driving of the vehicle and having a compensation function of compensating for variation in diameter of a hose occurring due to aging thereof caused by long-term use thereof, thereby preventing loss of fastening force.

In addition, another object of the present invention is to provide a band winding type hose clamp capable of solving a problem of a conventional hose clamp using a bolt-shaped fastening screw in which the fastening screw interferes with various elements installed in an engine compartment of a vehicle having a complex structure because the fastening screw is fastened in a circumferential direction of a band.

The present invention is also proposed to provide a band winding type hose clamp capable of solving drawbacks of the conventional hose clamp in which a space for manipulating a tool is greatly insufficient because the fastening clamp is fastened in the circumferential direction of the band and, as such, the task becomes difficult, thereby causing degraded task speed and degraded assemblability.

The present invention is also proposed to provide a band winding type hose clamp capable of solving a problem of the conventional hose clamp in which, when the bolt-shaped fastening screw is strongly fastened in order to firmly fasten the clamp, tearing of the clamp may occur and, as such, the clamp can no longer be used, or fastening force is rather decreased due to tearing of the clamp, thereby causing loss of the original function of the clamp.

The present invention is also proposed to provide a band winding type hose clamp in which it is unnecessary to form continuous grooves corresponding to threads of a fastening screw having a bolt shape, for use of the bolt-shaped fastening screw, and, as such, a separate process and a separate expense for manufacture of the band with grooves are unnecessary.

The present invention is also proposed to provide a band winding type hose clamp capable of using any one of a band formed with grooves and a general band having no groove, and achieving firm fastening even when a band separated from the clamp is used.

The present invention is also proposed to provide a band winding type hose clamp capable of providing enhanced aesthetics while preventing interference thereof with various elements installed in an engine compartment or injury of the worker during a task because an end of a band drawn in accordance with fastening of a fastening screw having a bolt shape does not protrude outwards.

Technical Solution

The object of the present invention can be achieved by providing a band winding type hose clamp including a body fixedly engaged with one end of a band, a winder rotatably coupled to the body, the winder receiving the other end of the band surrounding an outer periphery of a hose and winding the other end of the band in accordance with rotation thereof by external force, thereby causing the band to come into close contact with the outer periphery of the hose while pressing the outer periphery of the hose, and a cover pivotably coupled to a portion of the body spaced apart from the winder such that one end of the cover can engage with the winder, the cover selectively restraining rotation of the winder, thereby maintaining elastic force of the band pressing the outer periphery of the hose.

In accordance with an embodiment, the body may include a base, at which one end of the band is disposed, a pair of coupling parts respectively installed at opposite lateral edges of the base while being erected upwards, insertion holes respectively formed at the coupling parts, to rotatably receive the winder, hinge insertion holes formed at the coupling parts while being spaced apart from the insertion holes, respectively, such that the cover is pivotally coupled to the coupling part by a hinge shaft, and at least one band coupling slot formed at a predetermined inside position of the base such that the band is inserted into the base from an outside or inside of the base through the band coupling slot and is engaged with the base through bending thereof.

In accordance with an embodiment, the body may further include upper protrusions formed at an end of the base spaced apart from the band coupling slot, to protrude outwards and upwards, and elastic members each connected to a corresponding one of the upper protrusions and the cover at one end and the other end thereof, respectively, to provide elastic force to the cover pivotably coupled to the hinge insertion holes, thereby limiting pivotal movement of the cover.

In accordance with an embodiment, the winder may include a winding shaft rotatably coupled to the body, a slit formed through axial slitting of the winding shaft, to enable the band to be inserted into the winding shaft, a head formed at one of opposite longitudinal ends of the winding shaft such that the head is disposed at an outside of the body, and at least one gear provided at a portion of an outer peripheral surface of the winding shaft disposed at an inside of the body, the gear engaging with one end of the cover.

In accordance with an embodiment, the cover may include a pivotal part disposed above the body, and engagement parts installed at opposite lateral edges of the pivotal part, to extend downwards, while being pivotably coupled to the body, to enable pivotal movement of the pivotal part, each of the engagement parts having a protruding end that can engage with the winder, to restrain rotation of the winder.

In accordance with an embodiment, the cover may include a pressing part installed at the pivotal part such that the pressing part is vertically movable, the pressing part pressing one end of the band inserted into the body, thereby preventing the band from being separated from the body.

Advantageous Effects

The band winding type hose clamp according to each embodiment of the present invention has the following effects.

First, the band winding type hose clamp has an advantage in that the band winding type hose clamp has a relatively simple structure while preventing loosening thereof caused by vibration generated by an engine of a vehicle or due to driving of the vehicle and having a compensation function of compensating for variation in diameter of a hose occurring due to aging thereof caused by long-term use thereof, thereby preventing loss of fastening force.

Second, the band winding type hose clamp has an advantage in that the band winding type hose clamp can solve a problem of a conventional hose clamp using a bolt-shaped fastening screw in which the fastening screw interferes with various elements installed in an engine compartment of a vehicle having a complex structure because the fastening screw is fastened in a circumferential direction of a band.

Third, the band winding type hose clamp has an advantage in that the band winding type hose clamp can solve drawbacks of the conventional hose clamp in which a space for manipulating a tool is greatly insufficient because the fastening clamp is fastened in the circumferential direction of the band and, as such, the task becomes difficult, thereby causing degraded task speed and degraded assemblability.

Fourth, the band winding type hose clamp has an advantage in that the band winding type hose clamp can solve a problem of the conventional hose clamp in which, when the bolt-shaped fastening screw is strongly fastened in order to firmly fasten the clamp, tearing of the clamp may occur and, as such, the clamp can no longer be used, or fastening force is rather decreased due to tearing of the clamp, thereby causing loss of the original function of the clamp.

Fifth, the band winding type hose clamp has an advantage in that it is unnecessary to form continuous grooves corresponding to threads of a fastening screw having a bolt shape, for use of the bolt-shaped fastening screw, and, as such, a separate process and a separate expense for manufacture of the band with grooves are unnecessary.

Sixth, the band winding type hose clamp has an advantage in that the band winding type hose clamp can use any one of a band formed with grooves and a general band having no groove, and can achieve firm fastening even when a band separated from the clamp is used.

Seventh, the band winding type hose clamp has an advantage in that the band winding type hose clamp can provide enhanced aesthetics while preventing interference thereof with various elements installed in an engine compartment or injury of the worker during a task because an end of a band drawn in accordance with fastening of a fastening screw having a bolt shape does not protrude outwards.

BEST MODE

Figure 1:
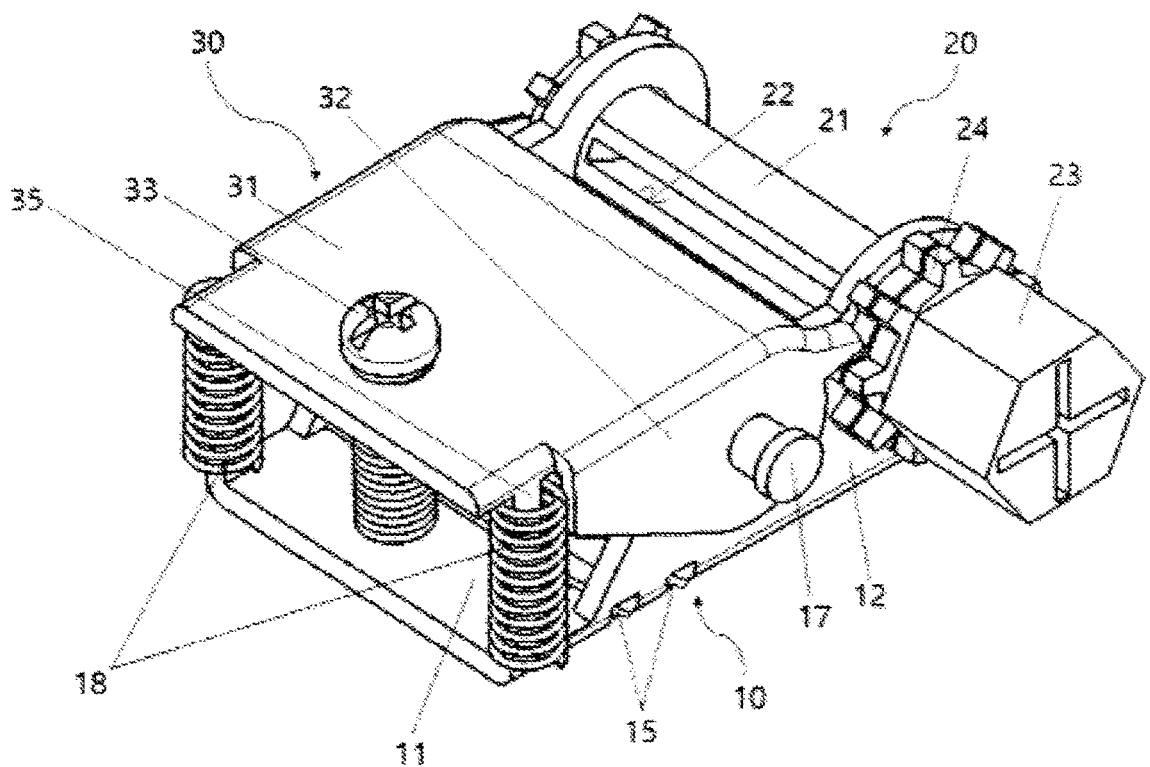
FIG. 1 is a perspective view of a band winding type hose clamp according to an embodiment of the present invention.

Advantages and features of the present invention and methods of accomplishing the same may be understood more readily by reference to the following detailed description of the exemplary embodiments and the accompanying drawings. The present invention may, however, be exemplarily embodied in many different forms and should not be construed as being limited to the exemplary embodiments set forth herein. Rather, these exemplary embodiments are provided so that this disclosure be thorough and complete and will fully convey the concept of the invention to those skilled in the art, and the present invention will only be defined by the appended claims. Like reference numerals refer to like elements throughout the specification.

In describing embodiments of the present invention, detailed descriptions of constructions or processes known in the art may be omitted when the detailed descriptions is judged to obscure the gist of the present invention. Further, the following terms are defined, taking into consideration functions in embodiments of the present invention and may be construed in different ways by intention or practice of users and operators. Therefore, the definitions of terms used in the specification should be construed based on the contents of the disclosure.

Figure 2:
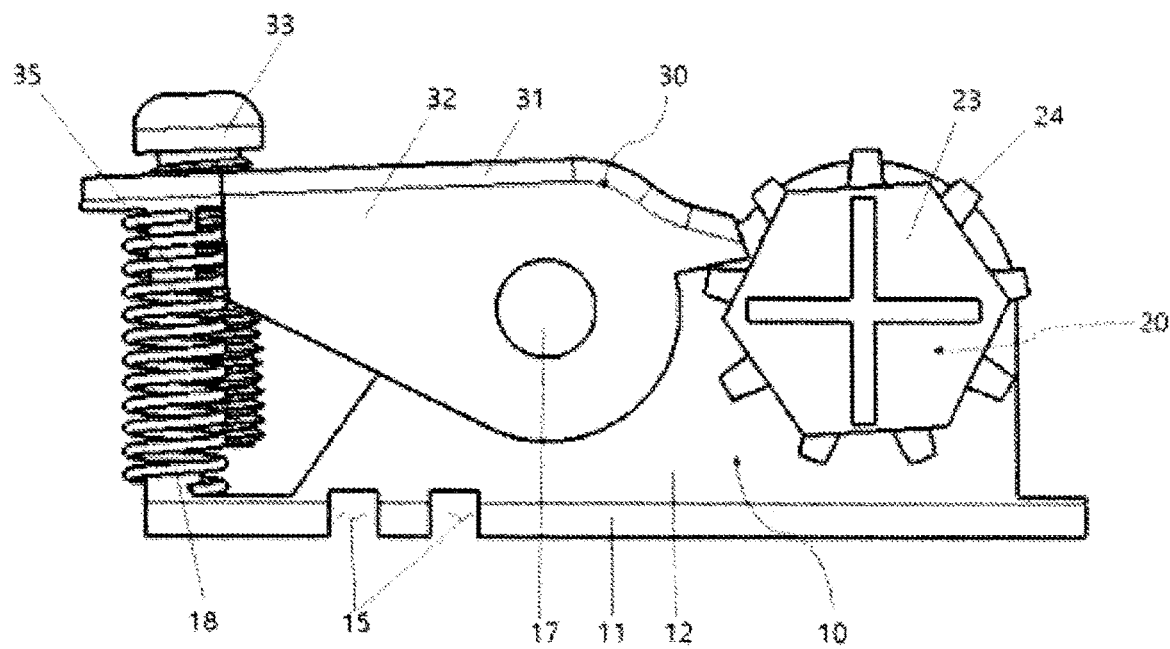
FIG. 2 is a side view of the band winding type hose clamp shown in FIG. 1.
Figure 3:
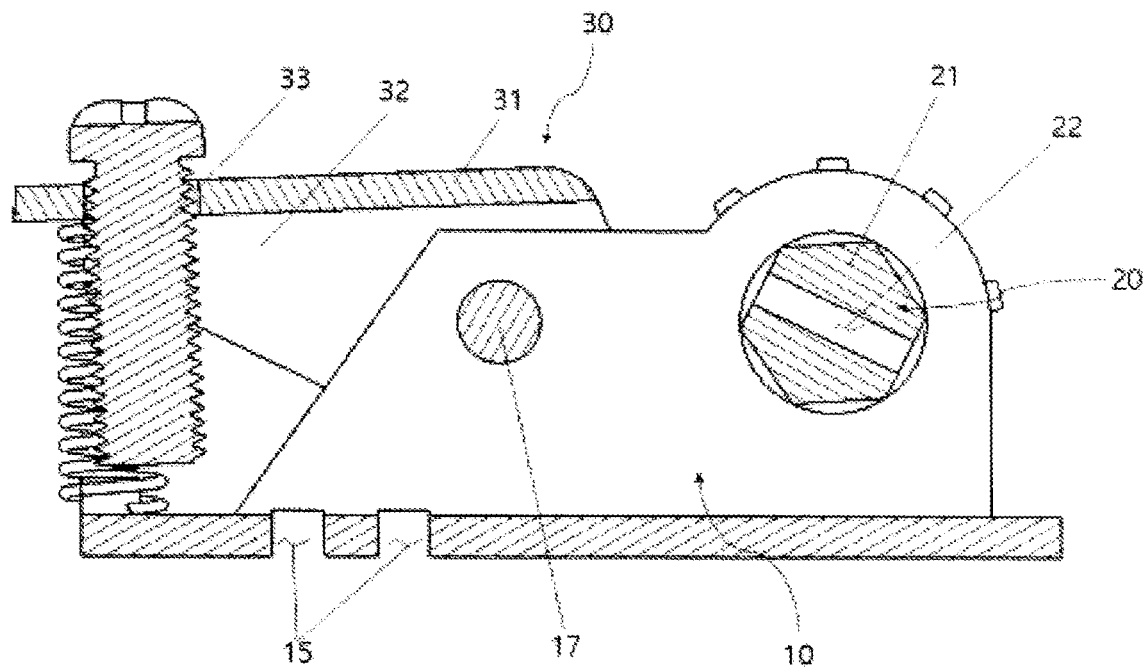
FIG. 3 is a sectional view showing an interior of the band winding type hose clamp shown in FIG. 2.
Figure 4:
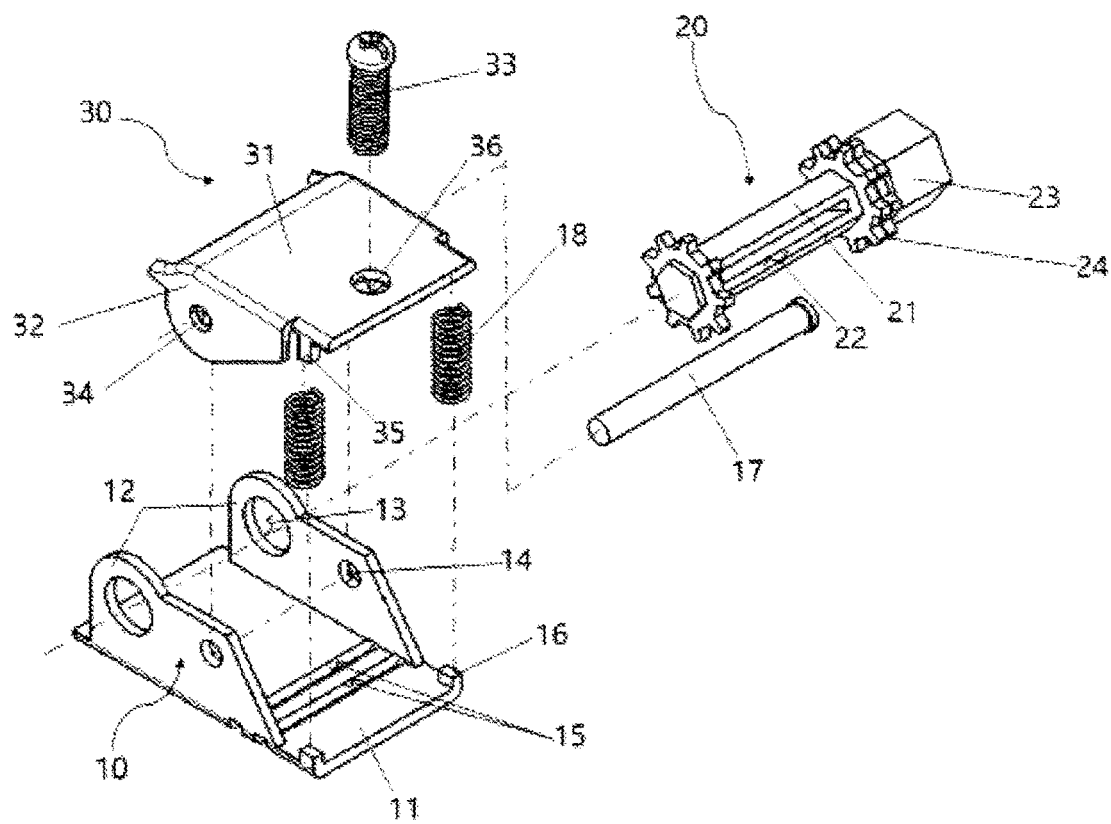
FIG. 4 is a perspective view of the band winding type hose clamp shown in FIG. 1.

FIG. 1 is a perspective view of a band winding type hose clamp according to an embodiment of the present invention. FIG. 2 is a side view of the band winding type hose clamp shown in FIG. 1. FIG. 3 is a sectional view showing an interior of the band winding type hose clamp shown in FIG. 2. FIG. 4 is a perspective view of the band winding type hose clamp shown in FIG. 1.

Referring to FIGS. 1 to 4, the band winding type hose clamp according to the embodiment of the present invention relates to a band winding type hose clamp capable of firmly fixing, to an installation place, a tubular hose used to feed a fluid such as water or gas to a designated place without being separated, by fastening the hose by a fastening member such as a band having a belt shape.

The band winding type hose clamp according to the embodiment of the present invention as described above has a configuration including a body 10, a winder 20, and a cover 30.

A band 1 is engaged, at one end thereof, with the body 10 in a fixed state.

The body 10 includes a base 11, a coupling part 12, an insertion hole 13, a hinge insertion hole 14, and a band coupling slot 15.

The base 11 is a bottom surface portion of the body 10, and has a substantially rectangular plate shape. One end of the band 1 is disposed at a longitudinal end of the base 11.

The coupling parts 12 are side surface portions of the body 10, respectively, and have a substantially trapezoidal shape. The coupling parts 12 are provided in a pair such that bottom sides thereof are coupled to opposite lateral edges of the base 11, respectively, in a state in which the coupling parts 12 are installed in an upwardly erected state such that upper sides thereof are directed upwards. The coupling parts 12 form a substantially "t" cross-sectional shape together with the base 11.

Respective insertion holes 13 and respective hinge insertion holes 14 are formed at the engagement parts 32. The winder 20 is rotatably inserted into the insertion holes 13 formed at the coupling parts 12.

That is, the insertion holes 13 enable one and the other longitudinal ends of the winder 20 to be coupled to the coupling parts 12 in a full extension state, respectively, and, as such, the winder 20 can rotate above the base 11 in accordance with hinge coupling.

The hinge insertion holes 14 are formed at the coupling parts 12 while being spaced apart from the insertion holes 13, respectively. The cover 20 is coupled at one side thereof to the coupling part 12 by a hinge shaft 17 such that the cover 30 can pivot upwards and downwards with respect to the coupling part 12.

In this case, the cover 30 coupled to the coupling part 12 through the hinge insertion holes 14 forms a structure having a substantially "A" shape such as a clothespin together with the body 10.

Figure 5:
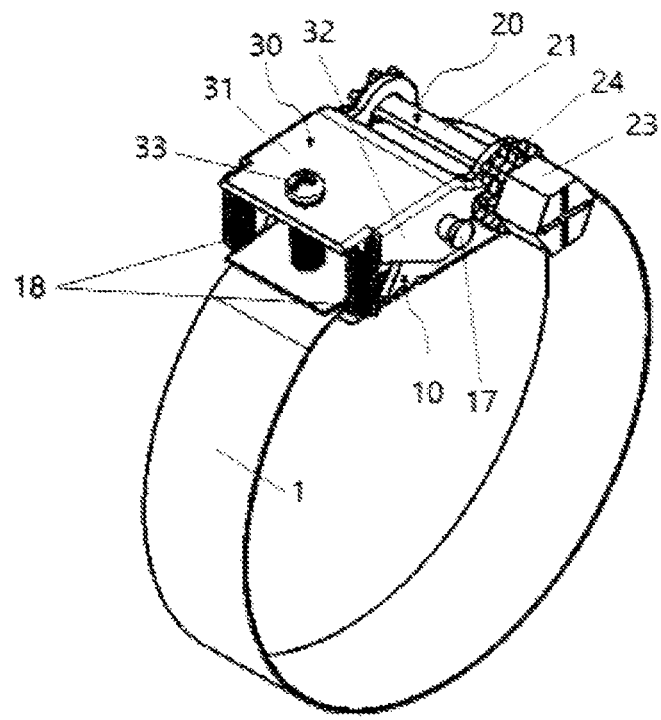
FIG. 5 is a perspective view showing an example in which a band is coupled to the band winding type hose clamp according to the embodiment of the present invention.
Figure 6:
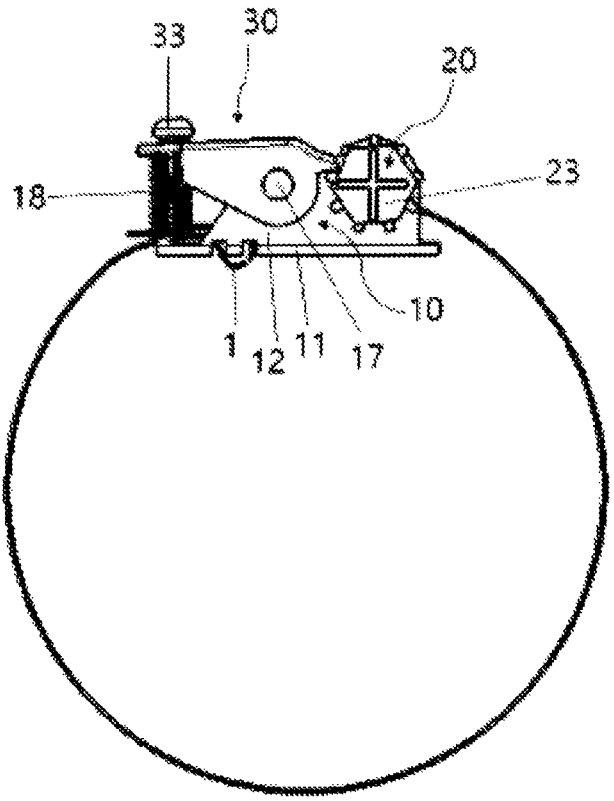
FIG. 6 is a side view of the band winding type hose clamp shown in FIG. 5.
Figure 7:
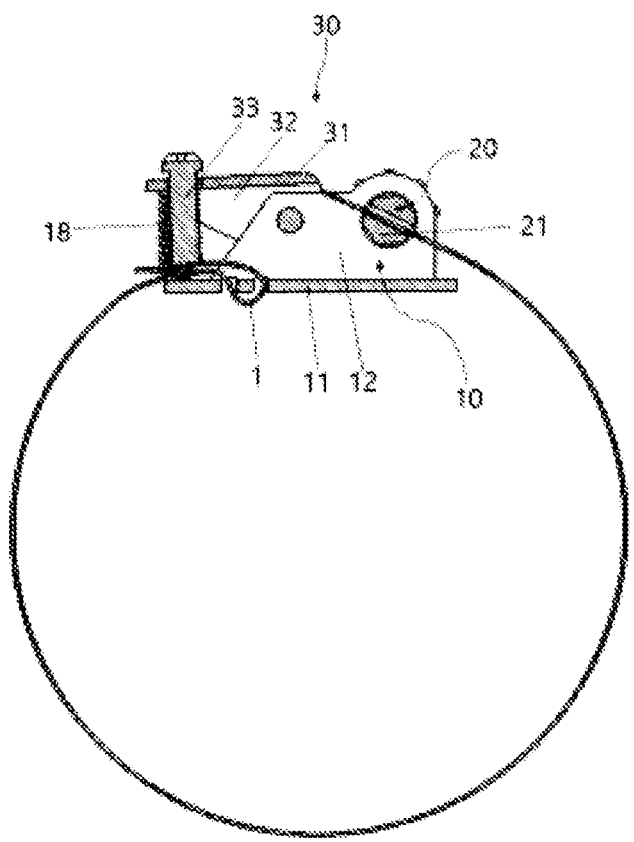
FIG. 7 is a sectional view showing an interior of the band winding type hose clamp shown in FIG. 6.
Figure 8:
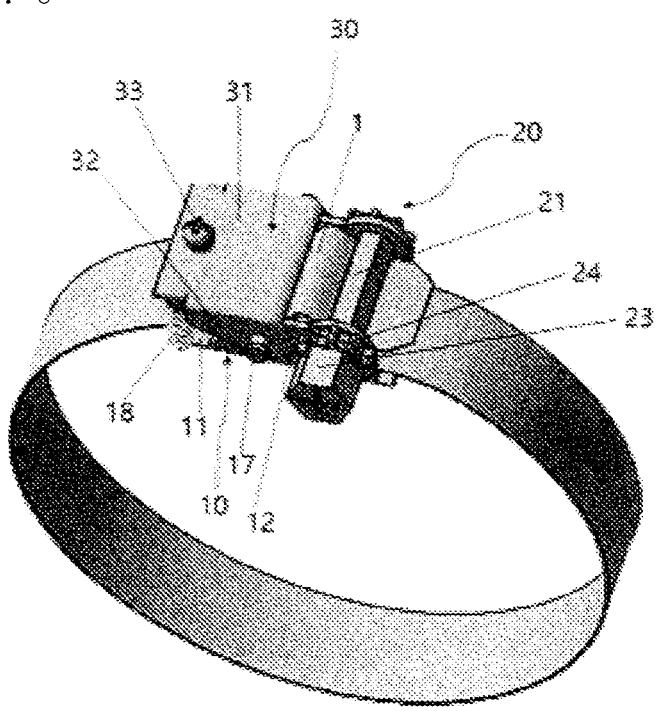
FIG. 8 is a view showing a state in which the band is fastened using the winder provided in the present invention.

FIG. 5 is a perspective view showing an example in which a band is coupled to the band winding type hose clamp according to the embodiment of the present invention. FIG. 6 is a side view of the band winding type hose clamp shown in FIG. 5. FIG. 7 is a sectional view showing an interior of the band winding type hose clamp shown in FIG. 6. FIG. 8 is a view showing a state in which the band is fastened using the winder provided in the present invention.

Referring to FIGS. 3 to 8, at least one band coupling slot 15 is formed at a predetermined inside position of the base 11 such that the band 1 is inserted into the base 11 from an outside or inside of the base 11 through the band coupling slot 15, and is engaged with the base 11 through bending thereof.

A pair of band coupling slots 15 is provided at an inner portion of the base 11 opposite to a portion of the base 11, at which the insertion holes 13 are disposed, such that the band coupling slots 15 extend in parallel while being spaced apart from each other. Of course, the present invention is not limited to the positions and number of the band coupling slots 15, and at least one band coupling slot 15 may be provided at various positions of the base 11.

One end of the band 1 passes through one band coupling slot 15 disposed at the side of one end of the base 11, at which the coupling parts 12 are disposed, from the inside of the base 11 to the outside of the base 11, and again passes through the other band coupling slot 15 from the outside of the base 11 to the inside of the base 11.

The end of the band 1 passing through the band coupling slots 15 can achieve continuous direction change such that the end is directed to the end side of the base 11 toward the band coupling slot 15, through which the end has first passed, that is, is directed to an opposite end of the band 1. Accordingly, the band 1 can be firmly fixed while surrounding the base 11.

In this case, the band 1, which is fixed through the band coupling slots 15 while surrounding the base 11, may sequentially pass through the band coupling slots 15 first from the outside to the inside and then from the inside to the outside, without being limited to enclosure of the band coupling slots 15 in the above-described sequence and directions. The band 1 may be fixed as the band 1 first passes through the band coupling slot 15 disposed at an inner portion of the base 11, and then passes through the other band coupling slot 15 disposed at an end side of the base 11.

Alternatively, one end of the band 1 fixed while surrounding the base 11 through the band coupling slots 15 may be disposed between the bottom surface of the base 11 and a tube. In this case, when the other end of the band 1 is pulled, upper and lower surfaces of the band 1 come into close contact with each other by the base 11 and the tube and, as such, the band 1 may be firmly fixed.

Of course, the end of the band 1 may be disposed to be directed to a portion of the base 11, at which the winder 20 is disposed, without being directed to the end side of the base 11 toward the band coupling slot 15, through which the end has first passed, that is, without being directed to the opposite end of the band 1.

Meanwhile, the body 10 of the present invention further includes upper protrusions 16 and elastic members 18.

The upper protrusions 16 are formed at an end of the base 11 spaced apart from the band coupling slots 15, to protrude outwards and upwards.

The upper protrusions 16 are provided in a pair such that the upper protrusions 16 are disposed at corners of the base 11, respectively. The elastic members 18 are fitted around the upper protrusions 16, respectively, and, as such, may be fixed without being separated from the base 11.

Each elastic member 18 is connected to the corresponding upper protrusion 16 and the cover 30 at one end and the other end thereof, respectively, to provide elastic force to the cover 30 pivotably coupled to the hinge insertion holes 14, thereby limiting pivotal movement of the cover 30.

Each elastic member 18 is constituted by a coil spring fitted around the corresponding upper protrusion 16 at one end thereof such that the coil spring is fixed to the base 11. The other end of the elastic member 18 is disposed at the cover 30. Accordingly, when the elastic member 18 is compressed in accordance with pivotal movement of the cover 30, the elastic member 18 applies, to the cover 30, elastic force generated in accordance with compression thereof.

Through the above-described elastic members 18, the cover 30 is maintained at a predetermined angle with respect to the base 11 without pivoting. Through external force such as pressing, selective pivoting of the cover 30 may be possible.

The winder 20 is rotatably coupled to the body 10. The other end of the band 1 surrounding an outer periphery of a hose is inserted into the winder 20. The winder 20 is rotated by external force and, as such, winds the other end of the band 1, thereby causing the band 1 to come into close contact with the outer periphery of the hose while pressing the outer periphery of the hose.

As shown in FIGS. 1 to 4, the winder 20 includes a winding shaft 21, a slit 22, a head 23, and a gear 24.

The winding shaft 21 has a rod shape. One and the other longitudinal ends of the winding shaft 21 are coupled to the coupling parts 12 in a full extension manner, respectively, and, as such, are rotatably coupled to the body 10 through hinge coupling.

As the above-described winding shaft 21 is rotated by external force, the other end of the band 1 is wound around an outer peripheral surface of the winding shaft 21. To this end, the outer peripheral surface preferably has a polygonal shape surrounded by planar surfaces, to achieve easy winding. Of course, the winding shaft 21 may have a cylindrical body having a circular cross-section without being limited to the above-described structure.

The slit 22 is formed by axially slitting the winding shaft 21, to enable the band 1 to be inserted into the winding shaft 21.

The other end of the band 1 extending from one end of the band 1 fixed while surrounding the base 11 passes through the winding shaft 21 after surrounding the outer periphery of the hose. Simultaneously with rotation of the winding shaft 21, the slit 22 is rotated, thereby causing the band 1 inserted thereinto to be wound around the winding shaft 21 in the form of a roll.

The head 23 is formed at one of opposite longitudinal ends of the winding shaft 21 such that the head 23 is disposed at an outside of the body 10.

The head 23 is coupled to the end of the winding shaft 21 at one end surface thereof and, as such, forms a substantially bolt shape together with the winding shaft 21. A "+" or "−"-shaped groove is formed at the other end surface of the head 23.

In addition, the head 23 has an outer peripheral surface having a polygonal shape surrounded by planar surfaces. Preferably, the head 23 has a triangular, quadrangular, pentagonal, or hexagonal cross-sectional shape or the like.

That is, the head 23 may be rotated by a screw or a wrench in a state in which the screw or the wrench is coupled to the "+" or "−"-shaped groove formed at the other end surface of the head 23 or the polygonal outer peripheral surface of the head 23. Simultaneously with the rotation, the winding shaft 21 is rotated.

At least one gear 24 is provided at a portion of the outer peripheral surface of the winding shaft 21 disposed at an inside of the body 10, and is engaged with one end of the cover 30.

The gear 24 has a planar gear shape having teeth at a periphery thereof at a uniform interval. Two gears 24 are provided at opposite ends of the winding shaft 21 spaced apart from the slit 22 such that the gears 24 are fitted around the winding shaft 21 at central portions thereof, respectively.

Referring to FIGS. 5 to 8, clockwise rotation of each gear 24 is preferably normal rotation. This is because, when the gear 24 rotates normally, pivotal movement of the cover 30 is allowed, and, as such, the end of the cover 30, which is positioned between adjacent teeth, can pass over a forward one of the teeth, whereas, when the gear 24 rotates reversely, pivotal movement of the cover 30 is restrained, and, as such, the end of the cover 30, which is positioned between adjacent teeth, is engaged with a rearward one of the teeth, to be locked.

Only one gear 24 may be provided at the winding shaft 21. Of course, two or more gears 24 may be provided at the winding shaft 21 such that the gears 24 are continuously arranged on the winding shaft 21. Alternatively, although not shown, only one gear 24 having an increased thickness may be provided. In accordance with such configurations, end locking of the cover 30 according to end engagement may be more effectively achieved.

The cover 30 is pivotably coupled to a portion of the body 10 spaced apart from the winder 20 such that one end of the cover 30 can engage with the winder 20. The cover 30 selectively restrains rotation of the winder 20 and, as such, elastic force of the band 1 pressing the outer periphery of the hose may be maintained.

The cover 30 includes a pivotal part 31 and engagement parts 32.

The pivotal part 31 has a planar structure having a substantially "¬" shape with a bent part. The pivotal part 31 is disposed above the body 10 such that the bent end is directed to the winder.

The pivotal part 31 may pivot upwards and downwards with respect to the body 10 through the engagement parts 32. The pivotal part 31 functions as a cover to prevent the winder 20, the elastic members 18, and the opposite ends of the band 1 disposed at an inside of the pivotal part 31 from being visible.

In this case, the pivotal part 31 is formed with a coupling hole 36 at an inside portion thereof at the side of a portion thereof not bent. A pressing part 33, which will be described later, is coupled to the coupling hole 36.

In addition, the pivotal part 31 is formed with lower protrusions 35 at corners of the pivotal part 31 formed with the coupling hole 36 such that the lower protrusions 35 correspond to the above-described upper protrusions 16 of the body 10, respectively. The other end of each elastic member fitted around the corresponding upper protrusion 16 is fitted around the corresponding lower protrusion 35.

Accordingly, each elastic member 18 is firmly fixed between the body 10 and the cover 30 without being separated and, as such, may efficiently apply elastic force to the cover 30.

In accordance with the above-described configuration, the pivotal part 31 prevents separation of elements disposed at the inside thereof, and covers the elements such that the elements have no protruding portion. Accordingly, safety of the worker and enhanced aesthetics may be secured.

The engagement parts 32 are installed at opposite lateral edges of the pivotal part 31, to extend downwards. The engagement parts 32 are pivotably coupled to the body 10, to enable pivotal movement of the pivotal part 31. Each engagement part 32 has a protruding end that can engage with the winder 20, to restrain rotation of the winder 20.

Each engagement part 32 has a planar structure having a substantially truncated funnel shape. In this case, a pair of engagement parts 32 is provided such that the engagement parts 32 are installed to extend vertically while being directed downwards. In this case, an inclined surface of each funnel structure is coupled to a corresponding one of the opposite lateral edges of the pivotal part 31 such that a truncated portion of each engagement part 32 is directed to the end of the body 10 formed with the band coupling slots 15, and an opposite inclined surface of each funnel structure is directed downwards. Accordingly, the engagement parts 32 form a "⊏" cross-sectional shape together with the pivotal part 31.

In this case, hinge holes 34 are formed at respective engagement parts 32. Accordingly, the engagement parts 32 are pivotably coupled to the body 10 through the above-described hinge shaft 17 and, as such, may be pivotable. Through this configuration, the pivotal part 31 may be pivotable with respect to the body 10.

Each engagement part 32 is provided with a protruding portion at an end thereof opposite to the truncated portion thereof. The protruding portion has a substantially triangular shape. The protruding portion functions as a wedge disposed between adjacent ones of the teeth formed at the winder 20 and, as such, selective rotation of the winder 20 is possible.

That is, the protruding portion of each engagement part 32 is inserted into a valley between adjacent teeth of the gear 24 such that the protruding portion presses the gear 24 toward a center of the winding shaft 21. As a result, the other end of each engagement part 32 functions as a stopper preventing rotation of the winding shaft 21 as the other end is configured to be prevented from being rotated by the gear 24 while being supported by the gear 24.

The above-described cover 30 includes a pressing part 33. The pressing part 33 is installed at the pivotal part 31 such that the pressing part 33 is vertically movable. The pressing part 33 presses one end of the band 1 inserted into the body 10, thereby preventing the band 1 from being separated from the body 10.

The pressing part 33 has a bolt structure formed with threads at an outer peripheral surface thereof such that the pressing part 33 is vertically shifted in the coupling hole 36 formed at the pivotal part 31. The pressing part 33 is threadedly coupled to the coupling hole 36. The pressing part 33 includes a head formed with a "+" or "−"-shaped groove at an outer end thereof and, as such, may be vertically movable in the coupling hole 36 using a driver or the like.

As an end of the pressing part 33 inserted into the coupling hole 36 is shifted toward the base 11, the end downwardly presses one end of the band 1 surrounding the base 11 toward the base 11.

Through clamping of the pressing part 33 as described above, the band 1 surrounding the base 11 may be more firmly fixed. Accordingly, even when the other end of the band 1 is pulled by the winder 20, firm fixing may be achieved without loosening of clamping.

In this case, since the pressing part 33 is threadedly coupled to the coupling hole 36, pivotal movement of the pivotal part 31 may be restrained by the end of the pressing part 33 pressing the band 1 in a state in which the pressing part 33 has been downwardly shifted to a great depth in the coupling hole 36 to press the band 1. Accordingly, it may be possible to prevent pivotal movement of the pivotal part 31 caused by unintentional pressing of the pivotal part other than intended pressing. Thus, rotation of the winder 20 is prevented, thereby maintaining elastic force of the band 1.

Meanwhile, although not described, in accordance with the present invention, the band 1 may be provided at opposite lateral surfaces thereof with lateral bent edges extending in a longitudinal direction while being bent by a predetermined angle in an outward direction of a space receiving the band 1 (toward a surface of the band not contacting the hose). In this case, it may be possible to provide superior clamping force without preventing damage to the sheath of an electric cable or an insulator.

The content of the band 1 as described above is disclosed in detail in Korean Patent Registration No. 10-1276061 filed on Apr. 9, 2013 in the name of the present applicant, registered on Jun. 10, 2013 and entitled "CABLE TIE" and, as such, no detailed description thereof will be given herein.

Hereinafter, a method of using the band winding type hose clamp of the present invention as described above will be described with reference to FIGS. 5 to 8.

First, one end of the band 1 is sequentially inserted into the band coupling slots 15 while changing insertion direction thereof and, as such, is coupled to the band coupling slots 15.

When the end of the band 1 is disposed beneath the pressing part 33 without being exposed to an outside of the cover 30, enhanced aesthetics may be secured.

Thereafter, the other end of the band 1 extends to surround a hose, and is then inserted into the slit 22.

Subsequently, the winder 20 is rotated to wind the other end of the band 1 and, as such, the band 1 surrounding the hose 1 is fastened while being pulled.

After completion of rotation of the winder 20, the pressing part 33, which has been inserted to a suitable depth in order to prevent restraint by the gear 24, is rotated to press one end of the band 1 inserted into the band coupling slots 15 and, as such, the overall process is completed.

If replacement of the band 1 is necessary due to aging of the hose or the like, the pressing part 33 is rotated to be unfastened in a direction in which the pressing part 33 is spaced away from the base 11. The head 23 is then rotated in a direction reverse to the pressing direction of the band 1, that is, an unfastening direction. In this state, replacement of the band 1 is possible in accordance with pulling of the band 1.

Alternatively, the pressing part 33 is rotated to be unfastened such that the pressing part 33 is spaced away from the base 11. In this state, the band 1 may be pulled under the condition that the pivotal part 31 is pressed. In this case, more rapid replacement may be achieved.

As apparent from the above description, the band winding type hose clamp has a relatively simple structure while preventing loosening thereof caused by vibration generated by an engine of a vehicle or due to driving of the vehicle and having a compensation function of compensating for variation in diameter of a hose occurring due to aging thereof caused by long-term use thereof, thereby preventing loss of fastening force.

The band winding type hose clamp can solve a problem of a conventional hose clamp using a bolt-shaped fastening screw in which the fastening screw interferes with various elements installed in an engine compartment of a vehicle having a complex structure because the fastening screw is fastened in a circumferential direction of a band.

The band winding type hose clamp can solve drawbacks of the conventional hose clamp in which a space for manipulating a tool is greatly insufficient because the fastening clamp is fastened in the circumferential direction of the band and, as such, the task becomes difficult, thereby causing degraded task speed and degraded assemblability.

The band winding type hose clamp can solve a problem of the conventional hose clamp in which, when the bolt-shaped fastening screw is strongly fastened in order to firmly fasten the clamp, tearing of the clamp may occur and, as such, the clamp can no longer be used, or fastening force is rather decreased due to tearing of the clamp, thereby causing loss of the original function of the clamp.

It is unnecessary to form continuous grooves corresponding to threads of a fastening screw having a bolt shape, for use of the bolt-shaped fastening screw, and, as such, a separate process and a separate expense for manufacture of the band with grooves are unnecessary. The band winding type hose clamp can use any one of a band formed with grooves and a general band having no groove.

The band winding type hose clamp can achieve firm fastening even when a band separated from the clamp is used. The band winding type hose clamp can provide enhanced aesthetics while preventing interference thereof with various elements installed in an engine compartment or injury of the worker during a task because an end of a band drawn in accordance with fastening of a fastening screw having a bolt shape does not protrude outwards.

Meanwhile, it will be apparent to those skilled in the art that the content of the present invention is only illustrative, and various modifications and variations can be made in the present invention without departing from the gist of the invention defined in the claims. Accordingly, the protection scope of the content of the present invention is not limited to specific embodiments as described above.

MODE FOR INVENTION

Various embodiments have been described in the best mode for carrying out the invention.

INDUSTRIAL APPLICABILITY

The above-described band winding type hose clamp is applicable to various fields. For example, the band winding type hose clamps are used in various industrial fields such as marine shipbuilding, communication, automobiles, air conditioners, ducts of coolers, service pipes, and sheaths of industrial electric cables or insulators.

The invention claimed is:

1. A band winding type hose clamp comprising:
a body fixedly engaged with one end of a band;
a winder rotatably coupled to the body, the winder receiving the other end of the band surrounding an outer periphery of a hose and winding the other end of the band in accordance with rotation thereof by external force, thereby causing the band to come into close contact with the outer periphery of the hose while pressing the outer periphery of the hose; and
a cover pivotably coupled to a portion of the body spaced apart from the winder such that one end of the cover can engage with the winder, the cover selectively restraining rotation of the winder, thereby maintaining elastic force of the band pressing the outer periphery of the hose,
wherein the body comprises a base, at which one end of the band is disposed, a pair of coupling parts respectively installed at opposite lateral edges of the base while being erected upwards, insertion holes respectively formed at the coupling parts, to rotatably receive the winder, hinge insertion holes formed at the coupling parts while being spaced apart from the insertion holes, respectively, such that the cover is pivotably coupled to the coupling part by a hinge shaft, and at least one band coupling slot formed at a predetermined inside position of the base such that the band is inserted into the base from an outside or inside of the base through the band coupling slot and is engaged with the base through bending thereof,
wherein the body comprises upper protrusions formed at an end of the base spaced apart from the band coupling slot, to protrude outwards and upwards, and elastic members each connected to a corresponding one of the upper protrusions and the cover at one end and the other end thereof, respectively, to provide elastic force to the cover pivotably coupled to the hinge insertion holes, thereby limiting pivotal movement of the cover.

2. The band winding type hose clamp according to claim 1, wherein the winder comprises a winding shaft rotatably coupled to the body, a slit formed through axial slitting of the winding shaft, to enable the band to be inserted into the winding shaft, a head formed at one of opposite longitudinal ends of the winding shaft such that the head is disposed at an outside of the body, and at least one gear provided at a portion of an outer peripheral surface of the winding shaft disposed at an inside of the body, the gear engaging with one end of the cover.

3. A band winding type hose clamp comprising:
a body fixedly engaged with one end of a band;
a winder rotatably coupled to the body, the winder receiving the other end of the band surrounding an outer periphery of a hose and winding the other end of the band in accordance with rotation thereof by external force, thereby causing the band to come into close contact with the outer periphery of the hose while pressing the outer periphery of the hose; and
a cover pivotably coupled to a portion of the body spaced apart from the winder such that one end of the cover can engage with the winder, the cover selectively restraining rotation of the winder, thereby maintaining elastic force of the band pressing the outer periphery of the hose, wherein the cover comprises a pivotal part disposed above the body, and engagement parts installed at opposite lateral edges of the pivotal part, to extend downwards, while being pivotably coupled to the body, to enable pivotal movement of the pivotal part, each of the engagement parts having a protruding end that can engage with the winder, to restrain rotation of the winder, wherein the cover comprises a pressing part installed at the pivotal part such that the pressing part is vertically movable, the pressing part pressing one end of the band inserted into the body, thereby preventing the band from being separated from the body.

* * * * *